UNITED STATES PATENT OFFICE 2,585,053

SOLID ESTERS AND METHOD OF MAKING SAME

Malcolm Kent Smith, Elizabeth, N. J., assignor to The Baker Castor Oil Company, Jersey City, N. J., a corporation of New Jersey No Drawing. Application January 6, 1949, Serial No. 69,593

29 Claims. (Cl. 106—244)

This invention relates to a process of treating aliphatic acid esters, such as vegetable and animal oils, to form irreversibly thermo-set, irreversibly insoluble, and irreversibly infusible plastic compositions, and to the products obtained by such process. In carrying out the invention, the properties of the final products are appreciably modified by the incorporation of other materials during the treating process. This is a continuation-in-part of my application Serial No. 692,738, filed August 23, 1946 and now abandoned, which, in turn, is a continuation-in-part of my application Serial No. 559,485, filed October 19, 1944 and published as an abstract in 637 O. G., page 125, August 22, 1950.

The products of this invention are particularly useful as compounding ingredients of rubbers, other elastomers and plastics, and are superior to previously known solid oils in their properties and uses. The starting materials used in the instant process are esters of aliphatic polyhydric alcohols containing at least 3 hydroxyl groups per molecule and of unsaturated aliphatic acids which may be naturally occurring fatty acids or synthetic aliphatic, mono-carboxylic acids of at least 11 carbon atoms. The treatment consists in passing an oxygen-containing gas, e. g., air, oxygen, or ozone, through said esters at an elevated temperature in the range from about 30° to about 200° C., until the irreversible thermo-set stage is reached. The process further consists in distributing an addend in said esters before or during the treatment with oxygen, but before said esters have reached the thermo-set stage. Said addends are selected from the class consisting of monohydric alcohol esters of aliphatic acids having from about 6 to about 24 carbon atoms per molecule, and sulfated and sulfonated derivatives of said esters and of said acids.

The instant process provides a convenient method of producing solid oils having addends uniformly distributed therein. When such modified solid oils are incorporated in elastomers and plastics, the compounding of the latter materials with the addends proceeds more smoothly than has heretofore been possible. The ease with which addend-containing, solid, thermo-set oils are incorporated into elastomers and the like correlates with the rapid mechanical break-down of such solid oils on rubber and similar mills. This break-down of the addend-containing solid oils is not a reversible process. Some re-solidification of the oils occurs on standing for some weeks, but the properties of such re-solidified oils are not equivalent to those of the oils before mastication. This condition is similar to that observed in the case of milled rubber which loses its plastic condition on aging.

The irreversibly thermo-set products of this invention differ markedly from the reversibly thermoplastic materials of the prior art. The latter materials have the same properties at any particular temperature, regardless of how many times the temperature of such materials is varied away from and back to said particular temperature. Said properties characteristic of the reversibly thermoplastic compounds at a particular temperature are attained instantaneously when the compounds reach said temperature.

The thermo-set products of this invention are characterized by having a higher chemically combined oxygen content than that of the starting polyhydric alcohol esters. It is known in the prior art to heat-treat polyhydric alcohol esters with metallic peroxides. Such peroxide treatment results in some increase of the chemically combined oxygen content of the starting esters. But it has been found that metallic soaps are formed in such compositions through saponification of the esters by the peroxides. And the presence of such soaps causes the formation of reversibly thermoplastic products when the polyhydric alcohol esters are heat-bodied, such products differing considerably in their properties and usefulness from the thermo-set products described herein.

It has also been known previously to heat-treat polyhydric alcohol esters in the presence of some of the addends utilized in the process of the present invention. However, such prior treatments have been carried out at quite elevated temperatures, namely considerably above 200° C., or at other temperatures in the presence of solvents. The process of the present invention requires neither of these reaction procedures, but proceeds smoothly at temperatures below 200° C. and in the absence of solvents. In fact, the use of the prior art reaction conditions would prove deleterious in the present instance. Further, in the prior art procedures referred to in this paragraph, there is no increase of the chemically combined oxygen content of the esters treated in the presence of the specified addends.

As indicated in the foregoing, the oxygen-treated products of this invention differ distinctly from products obtained by heat-bodying or polymerization of aliphatic acid esters. For example, castor oil is soluble in alcohol and is immiscible with mineral oils. Air blown castor oils (which are not thermo-set) are also soluble in alcohol, and immiscible with mineral oils. Blown esters, such as blown castor oil, have, as compared with the untreated esters, increased acetyl numbers, increased peroxide values, and increased content of "oxy-acids" (as determined by the relative insolubility of the acid components of the esters in petroleum ether). On the other hand, heat-polymerized castor oil does not retain the alcohol solubility of the raw oil, and, in addition, is characterized by being miscible with mineral oil. Heat-polymerized esters, when compared with the untreated esters, show little, if any, increase in acetyl number, peroxide value, and content of "oxy-acids" (as determined by increased oxygen content of the petroleum ether-insoluble acids). Other air-blown esters are distinguishable from the corresponding heat-polymerized esters by the same differences in properties as those which characterize air-blown and heat-polymerized castor oils. As an instance of the practical result of these differences, blown castor oil is an effective nitrocellulose lacquer plasticizer, while heat-polymerized castor oils are, in most cases, incompatible with nitrocellulose.

In this connection, Lewkowitsch, "Chemical Technology and Analysis of Oils, Fats, and Waxes," 6th edition, vol. 111, gives some data for linseed oils, contrasting the blown oil with the polymerized oil. Thus, at page 135, we find:

"The following table due to De Waele illustrates the course of polymerization in an oil kept out of contact with air. The oil (a Baltic oil) was heated in an atmosphere of carbon dioxide at 250° C.:

|  | Raw Oil | $CO_2$-Heated 12 Hours |
|---|---|---|
| Specific gravity at 15.5° C. | .9351 | .9423 |
| Refractive index at 25° C. | 1.4808 | 1.4835 |
| Iodine Value | 196.6 | 175.2 |
| Oxidized acids, per cent | 0.78 | 0.29 |

"The numbers recorded in the foregoing tables show ... that the higher the temperature to which the heating is carried, the greater is the specific gravity. Apparently the amount of oxidised acids increases in proportion to the specific gravity. The irregularities in their percentage numbers prove, however, that the proportion of oxidised acids depends on the access of air during the boiling, and the conclusion must therefore be drawn that, if access of air were excluded entirely, practically no oxidised acids would be formed."

Lewkowitsch gives some information on blown linseed oils at pages 193–196 of the same volume. Thus, "with a view to investigating the changes which take place when linseed oil dries, the author treated linseed oil at 120° C. with air for a varying number of hours, or, in other words, prepared 'blown' linseed oils. The results obtained on examining the products are set out in the following table:

"*Oxidised oil*

|  | Sp. Gr. at 15.5° C. | Sap. Val. | Oxidised Acids, Per Cent | True Acetyl Value |
|---|---|---|---|---|
| Linseed Oil |  |  |  | 11.7 |
| Linseed Oil, blown 2 hrs. at 120° C | 0.9334 | 189.8 | 1.2 | 17.22 |
| Linseed oil, blown 10 hrs. at 120° C | 0.9460 | 192.7 | 7.1 | 31.7 |

"The fact that oxidised linseed oil absorbs considerable amounts of oxygen during 'blowing' is brought out by the following elementary analyses due to Williams (Analyst 1898, 253):

|  | Carbon Per Cent | Hydrogen Per Cent | Oxygen Per Cent |
|---|---|---|---|
| Solid oil I | 74.32 | 10.04 | 15.64 |
| Solid oil II | 69.74 | 9.57 | 20.69 |
| Solid oil III | 69.52 | 9.49 | 20.99 |
| Solid oil IV | 64.74 | 9.01 | 26.25 |
| Solid oil V | 65.40 | 9.00 | 25.60 |
| Solid oil VI | 68.64 | 9.24 | 22.12 |
| Solid oil VII | 64.38 | 9.01 | 26.61 |
| Raw oil | 75.03 | 10.78 | 14.19 |
| Do | 75.40 | 10.64 | 13.96" |

The increase in the oxygen content of the blown oil, as demonstrated by the elementary analyses and the acetyl value determinations, accounts for the important differences between the properties of blown oils, and those of polymerized oils.

The esters which may be treated suitably according to this invention include the vegetable oils, such as castor oil, soybean oil, and linseed oil, and animal oils. In addition to the naturally occurring oils, esters formed by the esterification of aliphatic polyhydric alcohols containing at least 3 hydroxyl groups per molecule with unsaturated fatty acids present in the foregoing oils, or with unsaturated synthetic aliphatic, mono-carboxylic acids of at least 11 carbon atoms may be treated by the process of this invention with excellent results. Suitable polyhydric alcohols for the indicated esterification reactions are mannitol, sorbitol, pentaerythritol, glycerol, polyglycerol, trimethylol propane, hexahydroxycyclohexane, and the like. Suitable unsaturated aliphatic, monocarboxylic acids for use in the preparation of esters of the above type include ricinoleic acid, octadecadienoic acid, oleic acid, linoleic acid, linolenic acid, elaeostearic acid, licanic acid, lauroleic acid, myristoleic acid, gadoleic acid, erucic acid, arachidonic acid, clupanodonic acid, undecylenic acid, and the like.

Esters of the long-oil modified alkyd type (containing 50 per cent or more of esters of the aliphatic monocarboxylic acid), prepared by the modification of the above esters, may also be treated according to the process of this invention. In the formation of such alkyd type esters, the naturally-occurring esters may be modified by reaction with a polyhydric alcohol, such as those listed ante, and a minor amount of poly-carboxylic acid. Similarly, the synthetic esters are modified by reaction with a minor amount of a poly-carboxylic acid during the course of their preparation. These modification reactions can be effected at 100°–260° C. under vacuum, or in an inert gas atmosphere. Poly-basic acids suitable for use in this reaction include phthalic acid or anhydride, tartaric acid, citric acid, succinic acid, maleic acid or anhydride, malic acid, fumaric acid, malomalic acid, aconitic acid, adipic acid, azelaic acid, sebacic acid, diglycolic acid, thiodiglycolic acid, dilactic acid, salicylacetic acid, diphenic acid, camphoric acid, tetrachlorophthalic anhydride, and the like. The preparation of esters of this type is described in certain of the examples appearing post.

The materials which are added to the esters, such as vegetable or other oils, during or prior to their treatment with an oxygen-containing gas are monohydric alcohol esters of aliphatic acids having from about 6 to about 24 carbon atoms per molecule, and sulfated and sulfonated derivatives of said monohydric alcohol esters and of said acids. Typical esters, suitable for use as additives in this process, are esters of the fatty acid components of the vegetable and animal oils with monohydric alcohols, such as methyl alcohol, butyl alcohol, iso-amyl alcohol, 2-ethylbutyl alcohol, methyl iso-butyl carbinol, heptyl alcohol, citronellol, lauryl alcohol, cetyl alcohol, oleyl alcohol, carnaubyl alcohol, cyclopentanol, cyclohexanol, and the like, and with glycol ethers, such as 2-methoxy ethanol, 2-phenoxy ethanol, mono-ethyl ether of diethylene glycol, mono-hexyl ether of diethylene glycol, and the like, and esters of monohydric alcohols or of glycol ethers with mono- or polybasic acids, such as heptanoic acid, pelargonic acid, nonenoic acid, undecylenic acid, ricinoleic acid, acetoxyricinoleic acid, octadecadienoic acid, soybean oil fatty acids, linseed oil fatty acids, erucic acid, adipic acid, suberic acid, azelaic acid, sebacic acid, brassilic acid, dibasic acids derived from fats, and the like. Sulfated or sulfonated materials other than those indicated above, such as petroleum sulfonates, may be used similarly.

The products formed by this process have the added materials homogeneously distributed therein. The mechanical addition of addends to solid, irreversibly thermo-set, blown oils is not feasible. Thus, the uniform, improved products made by the process of this invention represent a distinct and noteworthy advance in the art.

In general, the esters which are being treated are heated to an elevated temperature, e. g., 30°–200° C., and preferably 85°–150° C., and blown with air or other oxygen-containing gas. At an appropriate point before the polyhydric alcohol ester has reached the irreversibly thermoset condition, the monohydric alcohol ester or other addend is incorporated in the polyhydric alcohol ester and is effectively dispersed by the use of efficient agitation means. Best results are attained when the addend is used in amounts varying from 5 to 30%, based on the final product.

With regard to the incorporation of an addend in the ester at an appropriate stage, it may be stated that, in many cases, if the added material is incorporated before there has been an appreciable increase in the viscosity of said ester, the reaction leading to the formation of a thermoset composition is apt to be hindered; whereas the reaction is accelerated if the addition is made at an intermediate stage. A few tests enable one to determine the optimum point at which to introduce a particular addend during the processing of a particular ester. In any event, the addition must be made before the esters gel and change from a thermoplastic to an irreversibly thermo-set condition.

The products of this invention are preferably not permitted to solidify in the reaction kettles, as otherwise the discharging and cleaning of the latter represents quite a problem. Small samples of the reaction mix may be withdrawn from the reactor from time to time, and cooled to determine the stage to which the reaction has progressed. In this way, the reaction can be carried out in the reactors (kettles) to a stage preceding the gelation (solidification) by a few minutes. The product is then filled into drums, barrels, or other shipping containers, and the final irreversibly thermo-set stage is reached in the shipping or storage containers before the mass cools to room temperature.

It has been found that with this process, when a solid, irreversibly thermo-set, blown oil has been formed from an oil that has an aliphatic ester of a monohydric alcohol dissolved in it, the solid oil maintains its final polymerized state more permanently than an ordinary solid, heat-treated oil does. Usually, a solid, heat-treated oil continues to polymerize slowly on standing, whereas the ester-modified oil of this invention maintains the polymerized state that is attained at the completion of the heat-treating operation very much better, and remains, in general, a softer and more flexible product, even when subjected to lower than normal temperatures. The products produced in accordance with this invention are also superior to ordinary solid, heat-treated oils for incorporation in natural or synthetic rubbers, particularly when ester-type additives are used, due to the plasticizing effect of the ester on the solid oil and possibly on the rubber. The monohydric alcohol esters have also been found to improve the wetting effect of solid oils in rubbers, so that reinforcing powders and pigments are more readily dispersed; the physical condition of the rubber is changed enough so that other properties, such as its adhesion with nitrocellulose cement, for example, are improved. The sulfated and sulfonated derivatives enumerated previously also improve the wetting effect of the solid, heat-treated oils as regards, for example, the incorporation of powders and pigments in rubbers by means of milling operations, but said derivatives do not rate as high in their over-all effectiveness as the non-sulfur-containing monohydric alcohol ester addends.

The following are given as specific examples of carrying out the invention (parts being expressed by weight):

*Example 1.*—95 parts of soybean oil were heated to 132° C. and blown with air until the viscosity of the oil increased to 1300 seconds Engler at 100° C. Then 5 parts of sulfonated petroleum oil ("petroleum sulfonate") were added, and blowing was continued at 105° C. until a solid, irreversibly thermoset product was formed. The product was a reddish gel, quite free from any tackiness. This material is quite useful as a processing aid in rubber compounding.

*Example 2.*—90 parts of castor oil were heated to 140° C. and blown with air until the viscosity of the oil reached 3600 seconds Engler at 100° C. Then, 10 parts of 2-methoxyethyl ricinoleate were added, and blowing was continued at 110° C. until a solid, irreversibly thermoset condition was reached. This condition was reached about 10% sooner than has been heretofore possible, and the product was softer and smoother than normal solid castor oil. This product gives better results in rubber compounding and in combination with resinous materials, asphalts, and the like than do normal solid oils.

The products of the following examples are also highly effective for uses such as those indicated for the products of Examples 1 and 2.

*Example 3.*—90 parts of dehydrated castor oil were blown at 120° C. until the oil reached an Engler viscosity of 1300 seconds at 100° C. Then, 10 parts of butyl octadecadienoate were added, and the mixture was blown at 110° C. until it reached a solid, irreversibly thermo-set condition. The product was not as dry or rubbery as a normal gel from dehydrated castor oil. It can also be vulcanized to a more coherent sheet because of the presence of the ester.

*Example 4.*—A heat polymerized oil was formed by holding 100 parts of linseed oil under vacuum at a temperature of 280° C. When the oil reached a viscosity of 1800 seconds Engler at 100° C., the temperature of the oil was allowed to drop below 150° C., and 20 parts of oleyl heptoate were introduced with vigorous stirring. The mixture was then blown with air at 115° C. until a solid, irreversibly thermo-set product was formed.

*Example 5.*—100 parts of sardine oil were blown with air at 125° C. Soon after the oil started to show an increase in body, 15 parts of heptyl undecylenate were added to the oil with agitation. The blowing was continued at 105° C. until the mixture reached a solid, irreversibly thermo-set condition.

*Example 6.*—100 parts of the pentaerythritol ester prepared by substantially completely esterifying pentaerythritol with equal molar parts of undecylenic acid and oiticica oil fatty acids were heated to 285° C. while maintaining a nitrogen atmosphere over the ester, and agitating the latter. When the oil reached a viscosity of Z-3 (Gardner-Holdt), the temperature was lowered to 110° C. 25 parts of sulfated methyl ricinoleate were then stirred into the oil; air-blowing of the oil was started at the same time, and was continued until the composition reached a solid, irreversibly thermo-set condition.

*Example 7.*—A heat-polymerized ester was formed by holding 100 parts of a sorbitol ester of herring oil fatty acids (said ester containing 4.5 equivalents of acid per mole of sorbitol) under vacuum at a temperature of 265° C. When the ester reached a viscosity of Z-3 (Gardner-Holdt), the temperature was lowered to 140° C. Then, 20 parts of methyl erucate were introduced into the ester with vigorous stirring. Air-blowing of the oil was started at the same time, and was continued until the composition reached a solid, irreversibly thermo-set condition.

*Example 8.*—100 parts of a mannitol-tall oil ester (4 equivalents of refined tall oil per mole of mannitol being used in the preparation of this ester) were heated to 125° C., and blown with air until the viscosity of the ester increased to 1300 seconds Engler at 100° C. Then 10 parts of sulfated undecylenic acid were stirred into the thickened ester. Air-blowing was continued at 125° C.–130° C. Until test samples showed that the ester was approaching a gelled condition, whereupon it was dropped into drums without cooling; the retained heat was sufficient to carry the ester to a solid, irreversibly thermo-set condition.

*Example 9.*—An ester was produced by reacting 12 parts of glycerol, 28 parts of phthalic anhydride, and 60 parts of castor oil at 180°–200° C. in an atmosphere of carbon dioxide for 6 hours. 90 lbs. of this ester were heated to 115° C. and blown with air until the viscosity of the ester had increased to 1300 seconds Engler at 100° C. Then, 10 lbs. of sulfonated erucic acid were stirred into the thickened ester; blowing was continued at 120° C. until the mixture reached a solid, irreversibly thermo-set condition.

*Example 10.*—13 parts of pentaerythritol, 11 parts of sebacic acid, and 80 parts of tung oil fatty acids were interacted at 180°–200° C. at a pressure of 25 mm. of Hg for 3 hours. 80 lbs. of the resulting ester were heated to 130° C. and blown with air until the viscosity of the ester had increased to 3600 seconds Engler at 100° C. Then 15 lbs. of sulfonated butyl acetyl ricinoleate were mixed into the ester with effective agitation; blowing was continued at 125° C. until the mixture reached a solid, irreversibly thermo-set condition.

*Example 11.*—120 lbs. of air-blown soybean oil, having a viscosity of 1540 seconds Engler at 100° C., were air-blown at 110° C. for 3 hours, the viscosity of the oil then being 3054 seconds Engler at 100° C. Then, 13.5 lbs. of the ethyl-butyl ester of soybean oil fatty acids were stirred into the heated oil. The resulting composition was air-blown at 110° C. until it had reached the stage such that it became gelled and irreversibly thermo-set soon after being dropped into a drum.

*Example 12.*—360 parts of air-blown soybean oil, having a viscosity of 1410 seconds Engler at 100° C., were air-blown at 110° C. for 2.5 hours; blowing was continued at 120° C. for 1.75 hours, the viscosity of the oil then being 2700 seconds Engler at 100° C. To this heated oil were added 40 lbs. of the ethyl-butyl ester of soybean oil fatty acids. The resulting composition was air-blown at 120° C. for 3.5 hours, at which time it had reached a gelled, irreversibly thermoset condition.

*Example 13.*—120 lbs. of air-blown linseed oil, having a viscosity of 1250 seconds Engler at 100° C., were air-blown at 105° C. for 0.5 hour. To this heated oil were added 13.5 lbs. of the ethyl-butyl ester of linseed oil fatty acids. The mixture almost immediately set up to a gelled, irreversibly thermo-set condition.

*Example 14.*—120 lbs. of air-blown soybean oil, having a viscosity of 1540 seconds Engler at 100° C., were air-blown at 105° C. for 3 hours. Then, 13.5 lbs. of the 2-methoxyethyl ester of soybean oil fatty acids were stirred into the heated oil. The resulting combination was air-blown at 105° C. until a test indicated that it was close to a gelled condition; it was then dropped into a drum in which the heat retained by the mass carried it to a solid, irreversibly thermo-set state.

*Use of solid oils in adhesive rubber compositions*

The products of this invention have been found to be extremely useful in improving the adhesive properties of butadiene-acrylonitrile rubbery copolymers. Such modified rubbers can be cemented to leather and other materials with the aid of nitrocellulose and other rubber-free cements, and have been found to be useful commercially as shoe soles. The following example illustrates the procedure used in modifying the properties of rubbery butadiene-acrylonitrile copolymers.

*Example 15.*—Hycar OR-15, a butadiene-acrylonitrile copolymer was used in this series of examples. After preliminary break-down of the Hycar, the following mixture was milled on a rubber mill with cooling, according to standard practice, for about 10 minutes:

| | Parts by weight |
|---|---|
| Hycar OR-15 | 100.0 |
| Zinc oxide (low lead content) | 5.0 |
| Stearic acid, double pressed | 0.5 |
| Benzothiazyl disulfide | 1.5 |
| | 107.5 |

Then, 30 parts of the product of Example 11 were added on the rolls in small increments, these additions being alternated with small portions of channel black until 50 parts of the latter had been added. Finally, 1.5 parts of sulfur were added. These additions were made over a period of 15 minutes, after which milling was continued for 5 minutes.

The resulting stock was very readily sheeted off the mill and was much more readily handled than an unplasticized stock. This stock was then vulcanized for 30 minutes at 60 lbs. steam pressure. The vulcanized compound prepared according to this example was noticeably plasticized, and was used in the adhesion tests described below.

*Example 16.*—This was identical with Example 15 except that 30 parts of the product of Example 12 were substituted for the 30 parts of the product of Example 11.

*Example 17.*—This was identical with Example 15, except that 30 parts of the product of Example 13 were substituted for the 30 parts of the product of Example 11.

*Example 18.*—This was identical with Example 15, except that 30 parts of the product of Example 14 were substituted for the 30 parts of the product of Example 11.

The reference compound was prepared according to the procedure used in Example 15, except that no solid oil was added. It was observed that the addition of the solid oil greatly facilitated the dispersion of the powdered solids in the rubber. The age of the solid oils of this invention is immaterial for the facilitation of such dispersion, but, with previously available solid oils, aging thereof removed their effectiveness as dispersion aids.

*Adhesion tests.*—Strips of vulcanized Hycar (unmodified and modified, as shown in Table 1) and of split leather 1″ x 6″ in size were twice coated on one side over 4″ of their length with nitrocellulose cement, each coat being allowed to air-dry for two hours. The cement consisted of 17.6 parts of 6-second lacquer-type nitrocellulose, 4.4 parts of a highly oxidized castor oil (known as Baker's Pale #4 Oil), and 78.0 parts of acetone. The dried coats were activated with a light brushing of acetone and the sticky surfaces of Hycar and leather were at once put together and joined at room temperature under a pressure of 45 lbs. per square inch for 12 minutes. The adhesion of these samples was determined by holding the free uncemented ends thereof in the testing clamps of a Scott Tester operating at 2 linear inches per minute. The readings obtained gave an indication of the pounds of force needed to separate the Hycar from the leather. These specimens were tested after aging for one hour and 24 hours, respectively, at room temperature.

*Table 1.—Modified Hycar-leather adhesion tests*

| Hycar | 1 hour tear | 24 hour tear |
|---|---|---|
| | lbs. | lbs. |
| Reference Compound | 4 | 9 |
| Product of Example 15 | 19 | 30 |
| Product of Example 16 | | 24 |

This tabulation shows that the addition of a solid oil containing an addend of this invention very greatly increased the ability of the plasticized nitrocellulose cement to produce adhesion between the Hycar and the leather. This is true of both the initial tear determined within one hour and the tear determined after curing for 24 hours. The products made in this manner possessed excellent flexibility and good physical properties.

Similar data have been obtained for others of the commercially available rubbery butadiene-acrylonitrile copolymers, and for the joining of rubbery butadiene-acrylonitrile copolymers to materials such as other rubbers, wood, metals, and ceramic materials.

*Vulcanization products*

When the products of this invention are vulcanized, rubbery materials are formed which are useful in a number of applications. Some of the results of the vulcanization studies are described below.

*Example 19.*—The product of Example 11 (100 parts) was compounded with 3 parts of zinc oxide
1 part of mercaptobenzothiazole, and
5 parts of sulfur.

This mixture was compounded in a Werner-Pfleiderer mixer, becoming vulcanized therein after being maintained at 90° C. for 2 hours.

*Example 20.*—A vulcanized solid, irreversibly thermoset oil composition was compounded with a rubbery butadiene-acrylonitrile copolymer, known as Hycar OR-15. This Example differs from Examples 15-18, in that, in the present Example, the solid oil was vulcanized before being compounded with the Hycar. This procedure gave rubber compounds with significantly improved properties over those of compounds containing no solid oil, and over those of compounds containing solid oil vulcanized concurrently with the Hycar.

The pre-vulcanized solid oil was prepared by compounding the product of Example 11 (100 parts) with 3 parts of zinc oxide,
1 part of mercaptobenzothiazole, and
2 parts of sulfur.

The base charge of 1200 gms. of solid oil was added to a small Werner-Pfleiderer mixer, and broken down for 1 hour; then the other components were added, and the whole was mixed for 30 minutes, the composition becoming rather liquid. The mixer was then covered and heated, the mass reaching about 85° C., and run until the product was so rough and rubbery that it tended to rise up out of the mixer. This product, on being milled, sheeted out quite nicely.

This vulcanized solid oil was then combined with Hycar OR-15 in the manner described in Example 15. The amounts of vulcanized oil used, and the curing period are indicated in the following table. Results are also included on Hycar containing no solid oil, and on Hycar containing solid, irreversibly thermo-set oils which were not pre-vulcanized.

Table 2

| Hycar | Parts of Solid Oil | Mins. of Cure | Tensile Strength | Elongation | Permanent Set | Shore Hardness | Shore Elasticity |
|---|---|---|---|---|---|---|---|
| | | | | | Per cent | | |
| | 0 | 15 | 3,915 | 535 | 45 | 75 | 85 |
| | 0 | 25 | 3,875 | 420 | 30 | 80 | 80 |
| | 0 | 35 | 3,460 | 350 | 20 | 80 | 75 |
| | 0 | 45 | 3,370 | 405 | 20 | 80 | 75 |
| From Example 15 | 10 | 15 | 2,040 | 675 | 40 | 75 | 90 |
| Do | 10 | 25 | 2,635 | 570 | 40 | 75 | 80 |
| Do | 10 | 35 | 2,600 | 500 | 30 | 75 | 75 |
| Do | 10 | 45 | 3,445 | 360 | 15 | 80 | 75 |
| Do | 20 | 15 | 1,495 | 770 | 80 | 70 | 95 |
| Do | 20 | 25 | 1,810 | 655 | 55 | 70 | 95 |
| Do | 20 | 35 | 1,900 | 620 | 45 | 70 | 95 |
| Do | 20 | 45 | 2,060 | 625 | 50 | 70 | 95 |
| Do | 30 | 15 | 915 | 895 | 100 | 65 | 100 |
| Do | 30 | 25 | 1,310 | 805 | 70 | 65 | 95 |
| Do | 30 | 35 | 1,600 | 765 | 70 | 65 | 90 |
| Do | 30 | 45 | 1,600 | 725 | 60 | 65 | 90 |
| From Example 17 | 10 | 15 | 2,715 | 705 | 65 | 75 | 95 |
| Do | 10 | 25 | 3,115 | 600 | 50 | 75 | 85 |
| Do | 10 | 35 | 3,160 | 530 | 40 | 75 | 80 |
| Do | 10 | 45 | 3,175 | 515 | 40 | 75 | 80 |
| Do | 20 | 15 | 1,755 | 850 | 90 | 70 | 95 |
| Do | 20 | 25 | 2,445 | 760 | 70 | 70 | 95 |
| Do | 20 | 35 | 2,555 | 705 | 60 | 70 | 95 |
| Do | 20 | 45 | 2,875 | 650 | 60 | 70 | 95 |
| Do | 30 | 15 | 930 | 900 | 100 | 70 | 95 |
| Do | 30 | 25 | 1,640 | 800 | 80 | 70 | 95 |
| Do | 30 | 35 | 2,220 | 780 | 70 | 70 | 90 |
| Do | 30 | 45 | 2,280 | 710 | 65 | 70 | 90 |
| From Example 18 | 10 | 15 | 2,920 | 725 | 60 | 75 | 95 |
| Do | 10 | 25 | 3,140 | 620 | 45 | 75 | 95 |
| Do | 10 | 35 | 3,445 | 565 | 40 | 75 | 80 |
| Do | 10 | 45 | 2,985 | 515 | 30 | 75 | 80 |
| Do | 20 | 15 | 1,940 | 810 | 80 | 70 | 95 |
| Do | 20 | 25 | 2,475 | 725 | 70 | 70 | 95 |
| Do | 20 | 35 | 2,960 | 655 | 50 | 75 | 95 |
| Do | 20 | 45 | 2,960 | 635 | 45 | 75 | 90 |
| Do | 30 | 15 | 970 | 915 | 100 | 70 | 95 |
| Do | 30 | 25 | 1,295 | 775 | 80 | 70 | 95 |
| Do | 30 | 35 | 2,085 | 745 | 70 | 70 | 90 |
| Do | 30 | 45 | 1,655 | 650 | 60 | 70 | 90 |
| From Example 21 | 10 | 15 | 2,580 | 740 | 50 | 80 | 95 |
| Do | 10 | 30 | 3,485 | 605 | 30 | 80 | 95 |
| Do | 10 | 45 | 3,565 | 495 | 20 | 80 | 95 |
| Do | 10 | 60 | 3,800 | 485 | 20 | 80 | 95 |

It will be noted in the table that all of the properties of the blank (no solid oil) are equalled or surpassed at some point in the curing cycle of the non-pre-vulcanized oil compositions. However, the pre-vaulcanized oil composition is superior in its over-all properties to the blank and to the compositions containing non-pre-vulcanised solid oil.

The solid oils of the present invention are also similarly useful in the compounding of various other synthetic rubbers, such as the polymers of the various butadienes-1,3, for example, butadiene - 1,3, methyl - 2 - butadiene - 1,3 (isoprene), chloro - 2 - butadiene - 1,3 (chloroprene or neoprene), piperylene, 2,3-dimethylbutadiene-1,3; or copolymers of such polymerizable material with another polymerizable compound which is capable of forming a copolymer with butadienes-1,3, for example, a compound which contains a $CH_2=C<$ group where at least one of the disconnected valences is connected to an electroactive group, i. e., a group which substantially increases the electrical dissymmetry or polar character of the molecule. Examples of compounds which contain such a $CH_2=C<$ group and which are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether, methyl vinyl ketone; and vinylidene chloride. Especially with copolymers of butadiene and styrene, and of butadiene and acrylonitrile, and neoprene (polymer of chloro-2-butadiene-1,3), the solid oils of the present invention demonstrated superior results of the order stated above, and were readily and smoothly incorporated into the synthetic rubber.

What is claimed is:

1. The process of forming thermo-set, irreversibly insoluble, and irreversibly infusible plastic compositions, which are useful as compounding ingredients for rubbers and other elastomers and plastics, by treating esters of unsubstituted aliphatic polyhydric alcohols containing at least 3 hydroxyl groups per molecule and of unsaturated aliphatic acids selected from the class consisting of naturally occurring fatty acids and synthetic aliphatic, mono-carboxylic acids of at least 11 carbon atoms, which treatment comprises passing an oxygen-containing gas through said esters at an elevated temperature in the range from about 30° to about 200° C. until the irreversibly thermo-set stage is reached, and distributing a modifying agent, selected from the class consisting of sulfated and sulfonated derivatives of aliphatic acids having from 6 to 24 carbon atoms per molecule and of unsubstituted monohydric alcohol and unsubstituted glycol ether esters of said acids in said polyhydric alcohol esters prior to the stage at which said polyhydric alcohol esters have become thermo-set, whereby said thermo-set plastic compositions are effectively stabilized against hardening caused by further polymerization and aging, and said thermoset polyhydric alcohol esters being characterized by having a higher chemically combined oxygen content than that of the polyhydric alcohol esters at the stage when the modifying agent is distributed therein.

2. The process of claim 1, in which the distribution of said modifying agent is effected during the treatment of said polyhydric alcohol esters with the oxygen-containing gas.

3. The process of claim 1, in which an oxygen-containing gas is passed through said polyhydric alcohol esters only after the addition of said modifying agent.

4. The process of claim 1, in which said oxygen-containing gas is air.

5. The process of claim 1, in which said polyhydric alcohol esters, prior to treatment with said modifying agent, are co-esterified with a polybasic carboxylic acid ester, the product of said co-esterification containing at least 50 per cent of said unsaturated aliphatic acid.

6. The process of claim 1, in which said ester being treated is an ester of ricinoleic acid with an aliphatic polyhydric alcohol.

7. The process of claim 1, in which said ester being treated is an ester of octadecadienoic acid with an aliphatic polyhydric alcohol.

8. The process of claim 1, in which said ester being treated is an ester of soybean oil fatty acids with an aliphatic polyhydric alcohol.

9. The process of claim 1, in which said distributed material is a monohydric alcohol ester of an aliphatic acid having from about 6 to about 24 carbon atoms per molecule.

10. The process of claim 1, in which said distributed material is a monohydric alcohol ester of ricinoleic acid.

11. The process of claim 1, in which said distributed material is a monohydric alcohol ester of octadecadienoic acid.

12. The process of claim 1, in which said distributed material is a glycol ether ester.

13. The process of claim 1, in which said ester being treated is castor oil, and said distributed material is 2-methoxyethyl ricinoleate.

14. The process of claim 1, in which said ester being treated is dehydrated castor oil, and said distributed material is the butyl ester of octadecadienoic acid.

15. The process of claim 1, in which said distributed material is a sulfated monohydric alcohol ester of an aliphatic acid having from about 6 to about 24 carbon atoms per molecule.

16. The process of claim 1, in which said ester being treated is pentaerythrital ricinoleate, and said distributed material is sulfated methyl ricinoleate.

17. The process of claim 1, in which said thermo-set plastic compositions are reacted with a vulcanizing agent to form tough, rubbery products.

18. An irreversibly thermo-set, irreversibly insoluble, and irreversibly infusible plastic composition comprising a solid, gelled, blown ester prepared by passing an oxygen-containing gas at a reaction temperature in the range from about 30° C. to about 200° C. through an ester of an unsubstituted aliphatic polyhydric alcohol containing at least 3 hydroxyl groups per molecule and of an unsaturated aliphatic acid selected from the class consisting of naturally occurring fatty acids and synthetic aliphatic, monocarboxylic acids of at least 11 carbon atoms, said solid ester containing, substantially homogeneously distributed therein, a modifying agent selected from the class consisting of sulfated and sulfonated derivatives of aliphatic acids having from 6 to 24 carbon atoms per molecule and of unsubstituted monohydric alcohol and unsubstituted glycol ether esters of said acids, and said solid ester being characterized by having a higher chemically combined oxygen content than that of the polyhydric alcohol ester when the modifying agent is distributed therein.

19. The composition of claim 18, in which said ester of an aliphatic polyhydric alcohol has been modified by reaction with a polybasic carboxylic acid, said modified ester containing at least 50% of said unsaturated aliphatic acid.

20. The composition of claim 18, in which said solid ester is prepared from an ester of ricinoleic acid with an aliphatic polyhydric alcohol.

21. The composition of claim 18, in which said solid ester is prepared from an ester of octadecadienoic acid with an aliphatic polyhydric alcohol.

22. The composition of claim 18, in which said solid ester is prepared from an ester of soybean oil fatty acids with an aliphatic polyhydric alcohol.

23. The composition of claim 18, in which said distributed material is a monohydric alcohol ester of an aliphatic acid having from about 6 to about 24 carbon atoms per molecule.

24. The composition of claim 18, in which said distributed material is a sulfated monohydric alcohol ester of an aliphatic acid having from about 6 to about 24 carbon atoms per molecule.

25. The composition of claim 18, in which said solid ester is prepared from castor oil, and said distributed material is 2-methoxyethyl ricinoleate.

26. The composition of claim 18, in which said solid ester is prepared from dehydrated castor oil, and said distributed material is butyl octadecadienoate.

27. The composition of claim 18, in which said solid ester is prepared from pentaerythritol ricinoleate, and said distributed material is sulfated methyl ricinoleate.

28. The process of claim 1, in which said thermo-set plastic compositions are reacted with a vulcanizing agent to form tough, rubbery products.

29. The tough, rubbery product of vulcanization of the composition of claim 18.

MALCOLM KENT SMITH.

REFERENCES CITED

The following references are of record in the file of this patent:

UNITED STATES PATENTS

| Number | Name | Date |
|---|---|---|
| 1,976,807 | Schaeffer | Oct. 16, 1934 |
| 2,135,976 | Koenig | Nov. 8, 1938 |
| 2,244,666 | Auer | June 10, 1941 |
| 2,402,909 | Novak | June 25, 1946 |
| 2,407,038 | Stamberger | Sept. 3, 1946 |